(12) United States Patent
Bauer et al.

(10) Patent No.: US 9,133,827 B2
(45) Date of Patent: Sep. 15, 2015

(54) METHOD FOR LUBRICATING AT LEAST ONE BLADE PITCH BEARING OF A WIND TURBINE

(75) Inventors: Oto Bauer, Brande (DK); Thomas Esbensen, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 737 days.

(21) Appl. No.: 13/364,433

(22) Filed: Feb. 2, 2012

(65) Prior Publication Data

US 2013/0034439 A1 Feb. 7, 2013

(30) Foreign Application Priority Data

Aug. 2, 2011 (EP) .................................... 11153696

(51) Int. Cl.
*F03D 11/00* (2006.01)
*F03D 7/02* (2006.01)
*F16C 19/52* (2006.01)
(Continued)

(52) U.S. Cl.
CPC .......... *F03D 11/0008* (2013.01); *F03D 7/0224* (2013.01); *F16C 19/52* (2013.01); *F16C 33/6637* (2013.01); *F16C 41/008* (2013.01); *F05B 2260/80* (2013.01); *Y02E 10/722* (2013.01); *Y02E 10/723* (2013.01)

(58) Field of Classification Search
CPC .................................................. F05B 2260/80
USPC .......... 415/1, 15, 17, 111, 118; 416/1, 30, 31, 416/39, 61, 153; 184/4, 6.4, 7.4, 6.12
See application file for complete search history.

(56) References Cited

U.S. PATENT DOCUMENTS

| 4,345,203 | A | 8/1982 | Dolfsma |
| 6,546,785 | B1 * | 4/2003 | Discenzo ..................... 73/53.05 |
| 8,043,054 | B2 * | 10/2011 | D et al. ............................ 416/1 |

(Continued)

FOREIGN PATENT DOCUMENTS

| EP | 0288940 A2 | 11/1988 |
| EP | 1942273 A2 | 7/2008 |

(Continued)

OTHER PUBLICATIONS

Mario Marchetti et al: "In-Situ, On-Demand Lubrication System for Space Mechanisms", NASA/TM—2002-211706, National Aeronautics and Space Administraion, Glenn Research Center, Jul. 2002.

*Primary Examiner* — Nathaniel Wiehe
*Assistant Examiner* — Woody A Lee, Jr.

(57) ABSTRACT

A method for lubricating at least one blade pitch bearing of a wind turbine is provided. The wind turbine includes a rotor hub with a number of rotor blades, with each rotor blade being supported to the rotor hub by at least one blade pitch bearing. At least one rotor blade is pitchable and a rotor blade pitch control device adapted to control pitching of the at least one rotor blade. The state of lubrication of at least one blade pitch bearing by a lubrication detection device generating at least one lubrication information signal indicating a degree of lubrication of the at least one blade pitch bearing by measuring the electrical capacitance and/or resistance of the at least one blade pitch bearing. A rotor blade lubricating device is actuated to perform at least one action to lubricate the at least one blade pitch bearing, if the lubrication information signal indicates that the at least one blade pitch bearing is not sufficiently lubricated.

18 Claims, 2 Drawing Sheets

(51) Int. Cl.
*F16C 33/66* (2006.01)
*F16C 41/00* (2006.01)

(56) References Cited

U.S. PATENT DOCUMENTS

| 2002/0066306 A1* | 6/2002 | Care ................................ 73/86 |
| 2003/0098691 A1 | 5/2003 | Matsuyama |
| 2008/0066543 A1* | 3/2008 | Sabini et al. ................ 73/304 C |
| 2010/0068055 A1 | 3/2010 | Garcia I Erill |
| 2010/0119370 A1* | 5/2010 | Myhr .............................. 416/39 |

FOREIGN PATENT DOCUMENTS

| WO | WO 8703053 A1 | 5/1987 |
| WO | WO 2005033535 A1 | 4/2005 |

\* cited by examiner

METHOD FOR LUBRICATING AT LEAST ONE BLADE PITCH BEARING OF A WIND TURBINE

CROSS REFERENCE TO RELATED APPLICATIONS

This application claims priority of European Patent Office application No. 11153696.7 EP filed Feb. 8, 2011. All of the applications are incorporated by reference herein in their entirety.

FIELD OF INVENTION

The invention relates to a method for lubricating at least one blade pitch bearing of a wind turbine, particularly a variable-pitch wind turbine, the wind turbine comprising a rotor hub having a number of rotor blades, with at least one rotor blade being supported to the rotor hub by at least one blade pitch bearing, whereby at least one rotor blade being pitchable around a rotor blade centre axis, and a rotor blade pitch control device adapted to control pitching of the at least one rotor blade.

BACKGROUND OF INVENTION

Modern wind turbines apply variable-pitch control, i.e. the rotor blades may rotate around a rotor blade centre axis. Therefore, the rotor blades are supported to a rotor hub by means of respective blade pitch bearings. Rotation of the rotor blades, that is the change of the respective pitch angle of the rotor blades is controlled by a rotor blade pitch control device adapted to control pitching of the respective rotor blades, i.e. the rotor blade pitch device adjusts the pitch angle of the respective rotor blades. Pitching of the rotor blades essentially depends on current climatic conditions such as the current wind speed and depends on control signals or control parameters such as the rotor speed reference and the power or torque reference. It is understood, that proper lubrication of the bearings is essential for maintaining the lifetime of the bearings and requires certain pitching of the rotor blades, making it important to the operation of the wind turbine as a whole.

SUMMARY OF INVENTION

Therefore, various methods for lubricating the respective bearings have been proposed.

US 2010/0068055 A1 discloses a method for dynamically lubricating a wind turbine blade pitch bearing. The method comprises determining at least one wind turbine operating condition or parameter related to the pitch activity, determining if lubrication is needed depending on the operating operations or the pitch activity parameters and causing lubrication of the pitch blade bearing if the determination operation is positive.

Another strategy of lubricating the respective bearing lies in a periodic injection of lubricant, which is the provision of a predetermined amount of lubricant per given time interval, and/or periodic pitching of the rotor blades.

However, the current degree of lubrication of the respective bearings is not taken into account by the known methods for lubricating the bearings. In fact, the known methods regularly lead to an overfilling of the bearings with the lubricant, which can lead to excessive leakage. On the other hand, it may also occur that the bearings are not sufficiently lubricated.

Hence, the given strategies for lubricating the bearings of a wind turbine, that is particularly the bearings of the rotor blade supporting the rotor blade to the rotor hub, are not satisfactory.

Therefore, it is the object of the present invention to provide an improved method for operating a wind turbine, particularly assuring a proper lubrication of the respective bearings of the rotor blades.

This is achieved by the method as described above, characterised in determining the state of lubrication of at least one blade pitch bearing by a lubrication detection device generating at least one lubrication information signal indicating a degree of lubrication of the at least one blade pitch bearing by measuring the electrical capacitance and/or resistance of the at least one blade pitch bearing, and actuating a rotor blade lubricating device to perform at least one action to lubricate the at least one blade pitch bearing, if the lubrication information signal indicates that the at least one blade pitch bearing is not sufficiently lubricated.

The inventive method considers the current state of lubrication of one or more respective bearings of the rotor blades by means of the lubrication detection device generating the lubrication information signal in terms of a diagnosis system monitoring the state of lubrication of the respective bearings. That is, in contrast to prior art, the inventive method allows a determination of the current state of lubrication of each or individual or individual groups of bearings, whereby lubrication of the respective bearings is performed, when the lubrication information signal indicates that lubrication is necessary. That is, the rotor blade lubricating device is actuated, i.e. performs at least one action to lubricate the respective bearings. Thereby, the rotor blade lubricating device may inject additional lubricant into the at least one bearing and/or actuate the rotor blade pitch control device to change the pitch angle of at least one rotor blade.

The generation of the lubrication information signal indicating the degree of lubrication is based on a measurement of the electrical capacitance and/or resistance of the respective bearing or bearings. The measurement of the electrical capacitance and/or resistance of the respective bearings allows a proper information regarding the current degree of lubrication of the respective bearings, that is the respective degree of the lubrication of the respective bearings may be estimated to an utmost extent.

Determining the state of lubrication of the at least one blade pitch bearing may be accomplished by determining the amount of lubricant, particularly the coating thickness h of the lubricant, between at least two components of the at least one blade pitch bearing moving relatively to each other. The principle is based on assuming the electrical capacitance C of the lubricated bearing as the electrical capacitance C of a plate capacitor. Hence, the thickness h of the lubricant between two components of the respective bearing building contact points and moving relatively to each other, that is between an outer or inner ring and a rolling element such as a ball or the like, for instance, is given by equation (i)

$$C = \epsilon_0 \epsilon_r A/h \quad \text{(i)}$$

with $\epsilon_0$ representing the vacuum permittivity, $\epsilon_r$ representing the relative peimittivity or relative dielectric constant of the lubricant, and A representing the area under the lubricant.

The electrical capacitance C of a bearing is determined by the capacitance $C_i$ representing the electrical capacitance between an inner ring and a rolling element and the electrical capacitance $C_o$ representing the electrical capacitance between an outer ring and a rolling element (cf. equation (ii)).

$$C = \sum_{n=i} \frac{C_i \cdot C_o}{C_i + C_o} \quad \text{(ii)}$$

Thereby, a first exemplary measurement setup uses an AC voltage signal in order to determine the electrical capacitance C between the lubricated components of the bearings contacting each other. The electrical capacitance C may be determined when the respective bearing is operated or not operated, that is when the respective components of the bearing are in motion or standing.

According to an alternative exemplary measurement setup, the bearing is assumed as a combination of an electrical capacitance C and an electrical resistance R in presence of a lubricant. A known electrical resistance R is connected in series with the respective bearing with a constant DC voltage. The known resistance R is used to determine the current flowing in the electrical circuit. The use of a DC voltage is essential, since the capacitance C of the bearing is non-polar and therefore, inactive to DC current. Hence, possible voltage drops are only based on the electrical resistance R of the bearing. In such a manner, controlling of the electrical resistance R of the bearing allows the determination of the amount of lubricant, particularly the thickness h of the lubricant between two contact points of the respective components of the bearing.

The rotor blade lubricating device is actuated, when the electrical capacitance C and/or the electrical resistance R approaches respective reference value(s) since this indicates that lubrication of the bearing is not sufficient, that is the presence of only a small amount of lubricant between the respective components of the bearing.

It is also possible that the lubrication information signal is processed in such a manner that it indicates the degree of wear of the at least one blade pitch bearing. The determination of the degree of wear of the respective bearing is possible, since the presence of, particularly electrically conductive, particles within the lubricant originating from friction and abrasion gives rise to a change of the measured variables, that is the electrical capacitance C and/or the electrical resistance R. Electrically conductive particles between contact points of the bearing, that is between the outer ring and a rolling element for instance, lead to interferences in the measurement signal. This change in the measurement signal, that is the influence of the particles, may be leveled out by known averaging techniques. Thereby, the information on particles between the contact points of the respective bearing allows an indication of the degree of wear of the respective bearing, since an increase of the amount of particles between the contact points leads to a decrease in the electrical resistance R. Hence, information regarding the lifetime of the respective bearing is also obtainable through processing of the lubrication information signal.

In a further embodiment of the invention, the rotor blade lubricating device considers at least one internal parameter and/or at least one external parameter for performing the at least one action to lubricate the at least one blade pitch bearing. The information from the at least one additional parameter may be used to constraint or disable pitch lubrication or adapt the lubrication strategy, such as changing the pitch movement trajectory based on at least one operational parameter. In such a manner, a precise and appropriate lubrication of the respective bearing or bearings may be executed.

Thereby, temperature and/or pressure of a hydraulic oil and/or the speed of the rotor hub and/or the rotor of the power generating unit and/or pitch angles and/or generated power of a power generating unit such as a generator of the wind turbine may be considered as an internal parameter and wind speed and/or ambient temperature and/or ambient pressure and/or air density may be considered as an external parameter. Of course, other internal and/or external parameters may be used as well; also internal states of the wind turbine control system.

In an embodiment, the lubrication information signal and/or lubricating parameters concerning at least one previous operation of the rotor blade lubricating device is stored in a memory unit, whereby the rotor blade lubricating device at least partially considers the data stored in the memory unit for performing the at least one action to lubricate the at least one blade pitch bearing. In such a manner, historic data and findings may be considered. That is, the rotor blade lubricating device is adapted to compare the current situation with at least one, if need be like situation from previous operations. Thereby, the current lubrication procedure may be optimised.

It is possible that the lubrication detection device generates at least one warning signal, if the at least one lubrication information signal indicates that the lubrication of the at least one blade pitch bearing is not sufficient, particularly when the rotor blade lubricating device already has performed at least one action to lubricate the at least one bearing. The warning signal gives a hint that the current state of lubrication of the respective bearing is insufficient and thus, the operation and/or the condition of the bearing is or may be negatively affected. The warning signal may be logged and used by the wind turbine control system and may also be transmitted to a central station controlling the operation of the wind turbine by means of respective communication devices.

Furthermore, it is thinkable that the lubrication detection device generates a stop signal for stopping the operation of the wind turbine, if the at least one lubrication information signal indicates that the lubrication of the at least one blade pitch bearing is not sufficient, particularly when the rotor blade lubricating device already has performed at least one action to lubricate the at least one bearing. In such a manner, the wind turbine is protected from damages, since its operation is turned off in the case of the lubrication detection device having detected insufficient lubrication of at least one respective bearing.

Aside, the invention relates to a wind turbine, particularly a variable-pitch wind turbine, especially adapted to execute the method as described before. The wind turbine has a rotor hub comprising a number of rotor blades, with each rotor blades being supported to the rotor hub by at least one blade pitch bearing, and at least one rotor blade being pitchable around a rotor blade centre axis, and a rotor blade pitch control device adapted to control the respective pitch angle of the at least one rotor blade, and a lubrication detection device. The lubrication detection device is adapted to generate at least one lubrication information signal indicating the degree of lubrication of the at least one blade pitch bearing by measuring the electrical capacitance and/or resistance of the at least one blade pitch bearing, whereby a rotor blade lubricating device adapted to perform at least one action to lubricate the at least one blade pitch bearing is actuated, when the lubrication information signal indicates that the at least one blade pitch bearing is not sufficiently lubricated. Thereby, the rotor blade lubricating device and the rotor blade pitch control device are adapted to communicate with each other.

The rotor blade lubricating device may be adapted to inject additional lubricant into the at least one blade pitch bearing and/or actuate the rotor blade pitch control device to change the pitch angle of at least one rotor blade in order to lubricate the at least one blade pitch bearing. Hence, the respective bearings are protected from insufficient lubrication by the injection of an additional amount of lubricant or additionally or alternatively changing of the respective pitch angle, that is turning the rotor blade and the respective bearing in a certain extent around the centre axis of the rotor blade.

The wind turbine may comprise a memory unit adapted to store lubrication information and/or operational data concerning at least one previous operation of the rotor blade lubricating device, with the rotor blade lubricating device and the memory unit are adapted to communicate with each other. In such a manner, historic data of previous lubricating actions may be considered before executing the lubrication of the respective bearings. Thereby, the current lubrication procedure may be optimised.

Besides, it is possible that the lubrication detection device is adapted to generate at least one warning signal, if the at least one lubrication information indicates that the lubrication of the at least one bearing is not sufficient, particularly when the rotor blade lubricating device already has performed at least one action to lubricate the at least one bearing. Thus, the case of at least one bearing being not sufficiently lubricated is perceivable by respective control systems, monitoring stations, service personal, or the like.

Furthermore, the lubrication detection device is adapted to generate a stop signal for stopping the operation of the wind turbine, if the at least one lubrication information signal indicates that the lubrication of the at least one blade pitch bearing is not sufficient, particularly when the rotor blade lubricating device already has performed at least one action to lubricate the at least one blade pitch bearing. Thus, the operation of the wind turbine may be stopped in the case of at least one respective bearing being not sufficiently lubricated, that is the risk of damages within the bearing and the wind turbine as a whole is diminished.

BRIEF DESCRIPTION OF THE DRAWINGS

In the following, the invention is described in detail as reference is made to the figures, whereby.

DETAILED DESCRIPTION OF INVENTION

Figure 1:
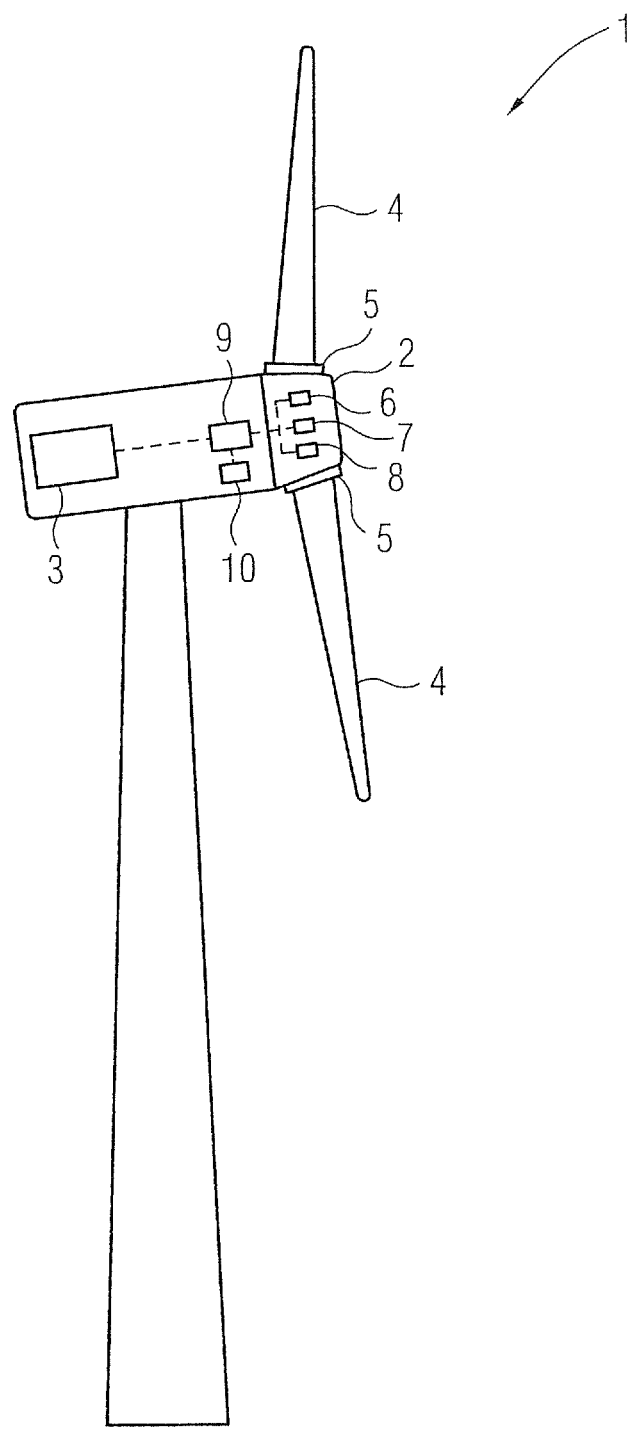
FIG. 1 shows a principle view of a wind turbine according to an exemplary embodiment of the present invention.

FIG. 1 shows a principle view of a wind turbine 1 according to an exemplary embodiment of the invention. The wind turbine 1 is built as a variable-pitch wind turbine.

A number of rotor blades 4 are supported to the rotor hub 2 by means of respective bearings 5 (blade pitch bearings). The rotor blades 4 are pitchable or rotatable around their rotor blade centre axes, whereby pitching of the respective rotor blades 4, that is changing of the respective pitch angle is controlled by a rotor blade pitch control device 6, comprising rotor blade pitch actuators (not shown). The rotor blade pitch control device 6 may perform pitching of the rotor blades 4 in individual or collective manner.

Furthermore, the wind turbine 1 comprises a lubrication detection device 7 adapted to generate at least one lubrication information signal indicating the degree of lubrication of the respective bearings 5 by individually measuring the electrical capacitance and/or resistance of the respective bearings 5.

Aside, a rotor blade lubricating device 8 is provided. The rotor blade lubricating device 8 is adapted to perform at least one action to lubricate the at least one bearing 5, when the lubrication information signal indicates that the respective bearing 5 is not sufficiently lubricated.

The rotor blade pitch control device 6, the lubrication detection device 7 and the rotor blade lubricating device 8 communicate with each other. Additionally, the rotor blade pitch control device 6, the lubrication detection device 7 and the rotor blade lubricating device 8 are connected to a central control unit 9 adapted to control the rotor blade pitch control device 6, the lubrication detection device 7, and the rotor blade lubrication device 8. The central control unit 9 may be connected to the power generating unit 3 of the wind turbine 1.

The wind turbine 1 further comprises a memory unit 10 adapted to store lubrication information and/or operational data concerning at least one previous operation of the rotor blade lubricating device 8. The memory unit 10 is adapted to communicate with the rotor blade lubricating device 8 and/or the central control unit 9.

Figure 2:
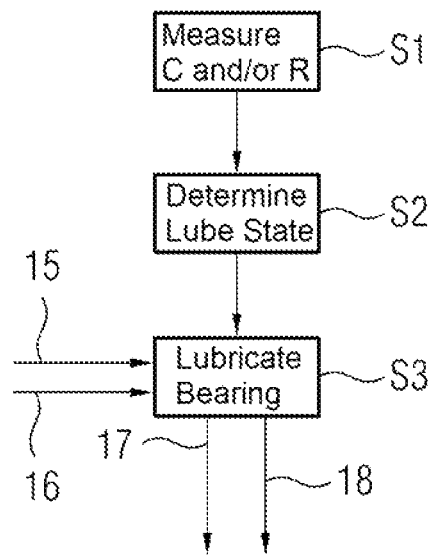
FIG. 2 shows a block diagram of the inventive method.

The method for lubricating of at least one bearing 5, particularly at least one blade pitch bearing, of the wind turbine 1 is explained with respect to FIG. 2. During normal operation of the wind turbine 1, the wind speed attacking the rotor blades 4 leads to rotation of the rotor hub 2 and further, to the generation of electric power by the power generating unit 3.

The state of lubrication of the respective bearings 5 is determined by the lubrication detection device 7 generating a lubrication information signal indicating a degree of lubrication of the respective bearings 5. In a first step S1 the electrical capacitance C and/or resistance R of the respective bearings 5 is measured. In the following step S2 the measured electrical capacitance and/or resistance is processed for determining the state of lubrication of the respective bearings 5. Thereby, the amount of lubricant, particularly the coating thickness h of the lubricant, between at least two components of the respective bearings 5 moving relatively to each other (cf. FIG. 3) is determined as described above. Generally, the measurement of the electrical capacitance C and/or resistance R and consequently, the determination of the state of lubrication of the respective bearings 5 may take place in continuous or intermittent manner.

In the case that the lubrication information signal indicates that at least one bearing 5 is not sufficiently lubricated, the rotor blade lubricating device 8 is actuated to perform at least one action to lubricate the respective bearing 5 in step S3, that is respective signals (cf. arrows 15, 16) are transmitted to the rotor blade lubricating device 8. Thereby, proper lubrication of the respective bearing(s) may be achieved by injecting an additional and proper amount of lubricant into the respective bearing 5 (corresponding to the respective signal as indicated by arrow 15) and/or actuating the rotor blade pitch control device 6 to change the pitch angle of the respective rotor blade 4 (corresponding to the respective signal as indicated by arrow 16), that is turn the respective rotor blade 4 so as to distribute the current amount of lubricant within the respective bearing 5 again.

With respect to the wind turbine 1 shown in FIG. 1, the actuation of the rotor blade lubricating device 8 is executed either directly via the lubrication detection device 7 or the central control unit 9.

Particularly in the case of pitching the rotor blade 4 in order to obtain a proper lubrication of the respective bearing 5, the rotor blade lubricating device 8 considers at least one internal parameter and/or at least one external parameter (cf. arrows 17, 18) for performing the respective action to lubricate the respective bearing 5. Thereby, temperature and/or pressure of a hydraulic oil and/or the speed of the rotor hub 2 and/or the rotor of the power generating unit 3 and/or pitch angles of the rotor blade 4 and/or generated power of the power generating unit 3 of the wind turbine 1 may be considered as an internal parameter (cf. arrow 17) and wind speed and/or ambient temperature and/or ambient pressure and/or air density may be considered as an external parameter (cf. arrow 18). This is essentially based on the fact that pitching of the rotor blade 4 affects the power output of the wind turbine 1. The wind turbine 1 comprises appropriate sensors (not shown) for measuring the respective internal and/or external parameters, which sensors are adapted to communicate with the central control unit 9.

Further, the lubrication detection device 7 considers previous lubrication information signals and/or lubricating parameters concerning at least one previous operation of the rotor blade lubricating device 8 while generating the lubrication information signal. Therefore, the lubrication detection device 7 and/or the central control unit 9 communicates with the memory unit 10 containing historic data regarding previous lubrication actions of the rotor blade lubricating device 8.

The lubrication detection device 7 is further adapted to generate at least one warning signal, if the lubrication information signal indicates that the lubrication of at least one bearing 5 is not sufficient, that is particularly, when the rotor blade lubricating device 8 already has performed an action to lubricate the respective bearing 5. In extreme cases it may be necessary that the lubrication detection device 7 generates a stop signal for stopping the operation of the wind turbine 1 in order to protect the wind turbine 1 from damages.

Figure 3:
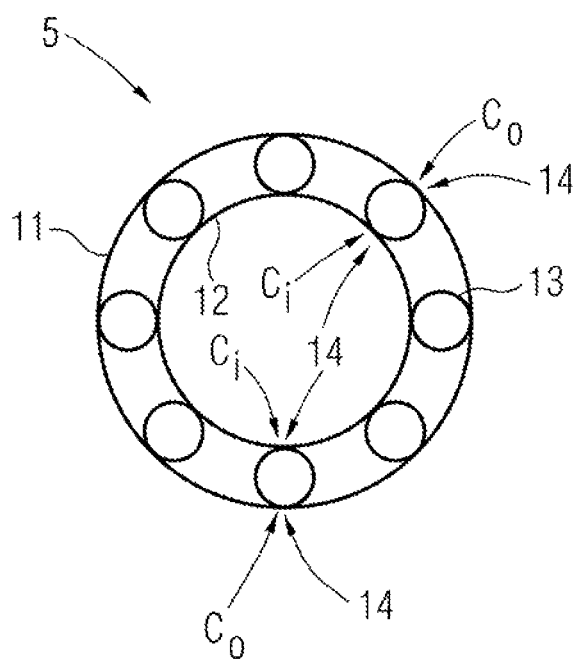
FIG. 3 shows a principle view of a rotor blade bearing with indicated electrical capacitances.

FIG. 3 shows a principle view of a rotor blade bearing 5 with indicated capacitances $C_i$ and $C_o$. The bearing 5 comprises an outer ring 11, an inner ring 12 and rolling elements in the shape of balls 13 rolling on respective raceways. All components of the bearing 5 are provided, that is coated with lubricant. The bearing 5 comprises several measurement points 14 for measuring the electrical capacitance C of the bearing 5, whereby the capacitance C of the bearing 5 is determined by the capacitances $C_i$ between the inner ring 12 and the balls 13 and the capacitances $C_o$ between the outer ring 11 and the balls 13 (cf. equation (ii)) for instance. Hence, the lubrication detection device 7 comprises respective electrical sensors (not shown) for obtaining the respective measurement signals, such that the capacitances $C_i$ and $C_o$ within the bearing 5, whereby the information from the sensors is processed to obtain the lubrication information signal.

Aside, the lubrication information signal may be processed in such a manner that it may indicate the degree of wear of a bearing 5. This is possible since particles originating from friction and abrasion lead to a change in the respective measurement signals of the sensors, that is the lubrication information signal changes depending on the presence of foreign particles within the lubricant mainly caused by a respective change of the electrical conductivity of the lubricant.

Hence, the inventive method allows a management of all issues regarding the lubrication of the respective bearings 5, particularly determining when lubrication of at least one bearing 5 is necessary. Thereby, the power production of the power generating unit 3 of the wind turbine 1 is influenced as small as possible, since lubrication of the respective bearings is only performed when it is absolutely necessary. Further, damages of the wind turbine 1 caused by insufficient lubrication of the respective bearings 5 are prevented.

The invention claimed is:

1. A method for lubricating at least one blade pitch bearing of a variable-pitch wind turbine comprising a rotor hub with a plurality of rotor blades, with each rotor blade being supported to the rotor hub by at least one blade pitch bearing, at least one rotor blade is pitchable and comprising a rotor blade pitch control device adapted to control pitching of the at least one rotor blade; the method comprising:
   generating with a lubrication detection device, at least one lubrication information signal indicating a degree of lubrication of the at least one blade pitch bearing by measuring an electrical capacitance of the at least one blade pitch bearing; and
   actuating the rotor blade pitch control device to change the pitch angle of at least one rotor blade in order to lubricate the at least one blade pitch bearing and actuating a rotor blade lubricating device to perform at least one action to lubricate the at least one blade pitch bearing when the lubrication information signal indicates that the at least one blade pitch bearing is not sufficiently lubricated.

2. The method according to claim 1, further comprising determining a state of lubrication of at least one blade pitch bearing by the lubrication detection device, wherein determining the state of lubrication of the at least one blade pitch bearing includes determining the coating thickness of the lubricant between at least two components of the at least one blade pitch bearing moving relatively to each other.

3. The method according to claim 1,
   wherein the lubrication information signal includes information that indicates the degree of wear of the at least one blade pitch bearing.

4. The method according to claim 1,
   wherein the rotor blade lubricating device considers at least one internal parameter, for performing the at least one action to lubricate the at least one blade pitch bearing, wherein the at least one internal parameter represents temperature, pressure of a hydraulic oil, the speed of the rotor hub, the speed of the rotor of the power generating unit, pitch angles, generated power of a power generating unit of the wind turbine, or any combination thereof.

5. The method according to claim 1,
   wherein the rotor blade lubricating device considers at least one external parameter, for performing the at least one action to lubricate the at least one blade pitch bearing, wherein the at least one external parameter represents wind speed, ambient temperature, ambient pressure, air density, or any combination thereof.

6. The method according to claim 1,
   wherein the lubrication information signal and/or lubricating parameters concerning at least one previous operation of the rotor blade lubricating device is stored in a memory unit, whereby the rotor blade lubricating device at least partially considers the data stored in the memory unit for performing the at least one action to lubricate the at least one blade pitch bearing.

7. The method according to claim 1,
   wherein the lubrication detection device generates at least one warning signal when the at least one lubrication information signal indicates that the lubrication of the at least one blade pitch bearing is not sufficient.

8. The method according to claim 7,
   wherein the at least one warning signal is generated when the rotor blade lubricating device already has performed at least one action to lubricate the at least one blade pitch bearing.

9. The method according to claim 1,
   wherein the lubrication detection device generates a stop signal for stopping the operation of the wind turbine when the at least one lubrication information signal indicates that the lubrication of the at least one blade pitch bearing is not sufficient.

10. The method according to claim 9,
wherein the lubrication detection device generates the stop signal when the rotor blade lubricating device already has performed at least one action to lubricate the at least one blade pitch bearing.

11. A wind turbine operable to lubricate at least one blade pitch bearing comprising:
a rotor hub comprising a plurality of rotor blades, with at least one rotor blade being supported to the rotor hub by at least one blade pitch bearing, and at least one rotor blade being pitchable around a rotor blade centre axis;
a rotor blade pitch control device that controls the respective pitch angle of the at least one rotor blade; and
a lubrication detection device that generates at least one lubrication information signal indicating the degree of lubrication of the at least one blade pitch bearing by measuring an electrical capacitance of the at least one blade pitch bearing,
wherein the lubrication detection device is configured to actuate a rotor blade lubricating device configured to perform at least one action to lubricate the at least one blade pitch bearing when the lubrication information signal indicates that the at least one blade pitch bearing is not sufficiently lubricated,
wherein the rotor blade lubricating device and the rotor blade pitch control device are communicatively coupled with each other, and
wherein the lubricating device actuates the rotor blade pitch control device to change the pitch angle of at least one rotor blade in order to lubricate the at least one blade pitch bearing.

12. The wind turbine according to claim 11, comprising
a memory unit configured to store lubrication information and/or operational data concerning at least one previous operation of the rotor blade lubricating device,
wherein the rotor blade lubricating device and the memory unit being communicatively coupled with each other.

13. The wind turbine according to claim 11
wherein the lubrication detection device is configured to generate at least one warning signal when the at least one lubrication information signal indicates that the lubrication of the at least one blade pitch bearing is not sufficient.

14. The wind turbine according to claim 13
wherein the lubrication detection device is configured to generate the at least one warning signal when the rotor blade lubricating device already has performed at least one action to lubricate the at least one blade pitch bearing.

15. The wind turbine according to claim 11
wherein the lubrication detection device is configured to generate a stop signal for stopping the operation of the wind turbine when the at least one lubrication information signal indicates that the lubrication of the at least one blade pitch bearing is not sufficient.

16. The wind turbine according to claim 15
wherein the lubrication detection device is configured to generate the stop signal when the rotor blade lubricating device already has performed at least one action to lubricate the at least one blade pitch bearing.

17. The wind turbine according to claim 11,
wherein the rotor blade lubricating device considers at least one internal parameter, for performing the at least one action to lubricate the at least one blade pitch bearing, wherein the at least one internal parameter represents temperature, pressure of a hydraulic oil, the speed of the rotor hub, the speed of the rotor of the power generating unit, pitch angles, generated power of a power generating unit of the wind turbine, or any combination thereof.

18. The wind turbine according to claim 11,
wherein the rotor blade lubricating device considers at least one external parameter, for performing the at least one action to lubricate the at least one blade pitch bearing, wherein the at least one external parameter represents wind speed, ambient temperature, ambient pressure, air density, or any combination thereof.

* * * * *